US011280891B2

(12) United States Patent
Hazama et al.

(10) Patent No.: US 11,280,891 B2
(45) Date of Patent: Mar. 22, 2022

(54) UNDERWATER DETECTION DEVICE, UNDERWATER DETECTION METHOD, AND UNDERWATER DETECTION PROGRAM

(71) Applicant: FURUNO ELECTRIC CO., LTD., Nishinomiya (JP)

(72) Inventors: Takuto Hazama, Nishinomiya (JP); Hisamitsu Takeuchi, Kobe (JP); Satoshi Misonoo, Nishinomiya (JP)

(73) Assignee: FURUNO ELECTRIC COMPANY LIMITED, Nishinomiya (JP)

( * ) Notice: Subject to any disclaimer, the term of this patent is extended or adjusted under 35 U.S.C. 154(b) by 364 days.

(21) Appl. No.: 16/508,163

(22) Filed: Jul. 10, 2019

(65) Prior Publication Data

US 2020/0018839 A1 Jan. 16, 2020

(30) Foreign Application Priority Data

Jul. 12, 2018 (JP) ............................ JP2018-131954

(51) Int. Cl.
*G01S 7/52* (2006.01)
*G01S 7/56* (2006.01)
*G01S 15/96* (2006.01)

(52) U.S. Cl.
CPC ............ *G01S 7/52004* (2013.01); *G01S 7/56* (2013.01); *G01S 15/96* (2013.01)

(58) Field of Classification Search
None
See application file for complete search history.

(56) References Cited

U.S. PATENT DOCUMENTS 4,057,049 A * 11/1977 Hill .......................... A61B 8/00 600/442
2008/0221449 A1 * 9/2008 Sato .................... G01S 7/52071 600/442

* cited by examiner

*Primary Examiner* — Hovhannes Baghdasaryan
(74) *Attorney, Agent, or Firm* — Studebaker & Brackett PC

(57) ABSTRACT

An underwater detection device may include a transmitter, which may include a transmitter, a receiver, and processing circuitry. The transmitter may be configured to transmit a transmission wave. The receiver may be configured to receive a reflection wave of the transmission wave. The processing circuitry may be configured to acquire a first position of a ship and a first measurement value that is a measurement result of the reflection wave at the first position, determine whether a relationship between the first position and a second position of the ship or another ship meets a given condition, and calculate a correction value based on the first measurement value and a second measurement value that is a measurement result of the reflection wave at the second position under a circumstance when the given condition is met.

20 Claims, 10 Drawing Sheets

UNDERWATER DETECTION DEVICE, UNDERWATER DETECTION METHOD, AND UNDERWATER DETECTION PROGRAM

CROSS-REFERENCE TO RELATED APPLICATION(S)

This application claims priority under 35 U.S.C. § 119 to Japanese Patent Application No. 2018-131954, which was filed on Jul. 12, 2018, the entire disclosure of which is hereby incorporated by reference.

TECHNICAL FIELD

The present disclosure relates to an underwater detection device, an underwater detection method, and an underwater detection program.

BACKGROUND

Conventionally, technologies related to underwater detection devices have been developed, which transmit a transmission wave toward underwater, receive a reflection wave of the transmission wave, and detect an underwater target object based on the measurement result of the received reflection wave. For example, JP2001-281335A discloses a fish finder which includes a transmitting and receiving means for transmitting an ultrasonic wave toward underwater and receiving an incoming reflection echo of the ultrasonic wave which reflects on a target object, through a transducer, a correction value calculating means for calculating a correction value corresponding to an installation attenuating amount which is an amount of attenuation according to an installed state of the transducer, the attenuation being caused to the level of the reflection echo obtained by the transmitting and receiving means, and an installation attenuating amount correcting means for correcting the installation attenuating amount based on the correction value.

Since the sensitivity of detecting the target object by the underwater detection device varies due to the influences of, for example, the aged deterioration of the transducer, it is often difficult to continue the accurate detection of the target object for a long period of time.

SUMMARY

The purpose of the present disclosure relates to provide an underwater detection device, an underwater detection method, and an underwater detection program, which can continue accurate detection of a target object for a long period of time.

According to one aspect of the present disclosure, an underwater detection device comprises, which may include a transmitter, a receiver, and processing circuitry. The transmitter may be configured to transmit a transmission wave. The receiver may be configured to receive a reflection wave of the transmission wave. The processing circuitry may be configured to acquire a first position of a ship and a first measurement value that is a measurement result of the reflection wave at the first position, determine whether a relationship between the first position and a second position of the ship or another ship meets a given condition, and calculate a correction value based on the first measurement value and a second measurement value that is a measurement result of the reflection wave at the second position under a circumstance when the given condition is met.

The processing circuitry may be configured to correct the second measurement value based on the correction value when the given condition is not met.

The first measurement value is acquired at a first timing and the second measurement value is acquired at a second timing, different from the first timing.

According to this configuration, the measurement result of the reflection wave at the first position may be acquired, for example, each time the ship passes through the first position, and the correction of the measurement result of the reflection wave when the ship travels locations other than the first position may be performed using the acquired measurement result, thereby obtaining the measurement result with the reduced influences of aged deterioration etc. of an oscillating element in the transmitter. Thus, the accurate detection of the target object can continue for a long period of time.

BRIEF DESCRIPTION OF DRAWINGS

The present disclosure is illustrated by way of example and not by way of limitation in the figures of the accompanying drawings, in which like reference numerals indicate like elements and in which.

DETAILED DESCRIPTION

Figure 1:
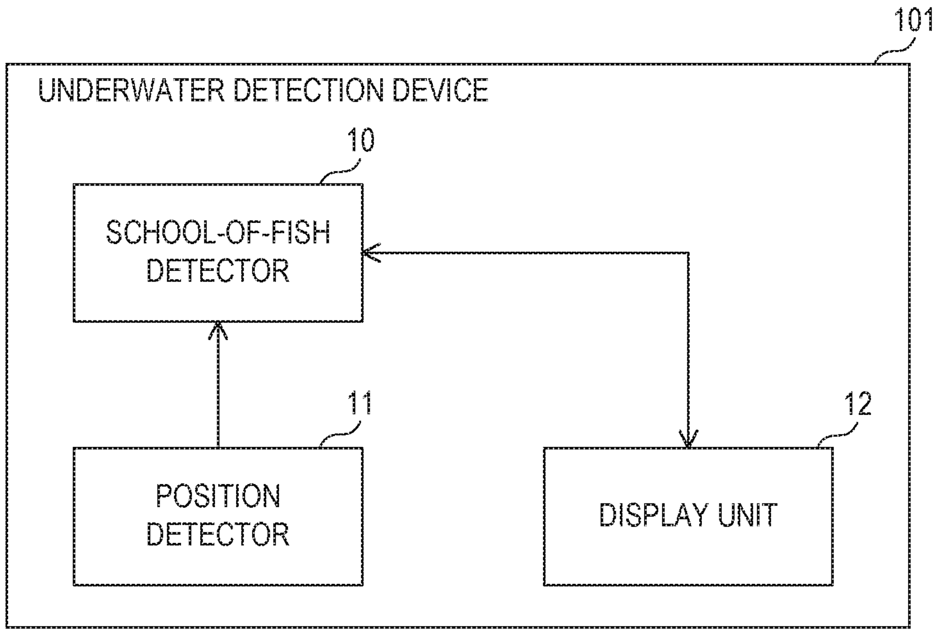
FIG. 1 is a view illustrating a configuration of an underwater detection device according to a first embodiment of the present disclosure.

Hereinafter, several embodiments of the present disclosure will be described with reference to the accompanying drawings. Note that the same reference characters are given to the same or corresponding components throughout the figures to omit redundant description. Note that at least parts of the embodiments described below may be combined arbitrarily.

First Embodiment

Configuration and Basic Operation]
(Entire Configuration)

FIG. 1 is a view illustrating a configuration of an underwater detection device according to a first embodiment of the present disclosure.

Referring to FIG. 1, an underwater detection device 101 may be mounted on a ship (hereinafter, referred to as "the ship" in order to be distinguished from other ships), such as a fishing boat, and include a school-of-fish detector 10, a position detector 11, and a display unit 12. Note that the present disclosure may be applied to ships which typically travel on water or sea, which are referred to as surface ships, and may also be applied to other types of ships including boats, dinghies, watercrafts, and vessels. Further, the present disclosure may also be applied, if applicable, to submarines, aircrafts, and spaceships, as well as any types of vehicles which travel on the ground, such as automobiles, motorcycles, and ATVs.

The position detector 11 may receive positioning signals from GPS antennas (not illustrated) fixed to the ship, detect a ship position which is the position of the ship, and output to the school-of-fish detector 10 positional information indicative of the detected ship position and a time at which the ship position is detected.

The school-of-fish detector 10 may receive the positional information outputted from the position detector 11. Moreover, the school-of-fish detector 10 may transmit a transmission wave periodically or irregularly, receive a reflection wave of the transmission wave, and detect a target object, such as a school of fish, based on the measurement result of the received reflection wave.

In more detail, the school-of-fish detector 10 may calculate, as the measurement result of the received reflection wave, for example, a signal intensity TS which is an intensity of the reflection wave from an underwater target object, and save the calculated signal intensity TS and the positional information received from the position detector 11 so as to be associated with each other. Moreover, the school-of-fish detector 10 may detect the target object underwater based on a plurality of sets of signal intensities TS and the positional information.

The display unit 12 may display a screen indicating the plurality of signal intensities TS corresponding to the plurality of positions on a nautical chart, respectively, based on the plurality of sets of signal intensities TS and the positional information saved by the school-of-fish detector 10.

(Configuration of School-of-Fish Detector)

Figure 2:
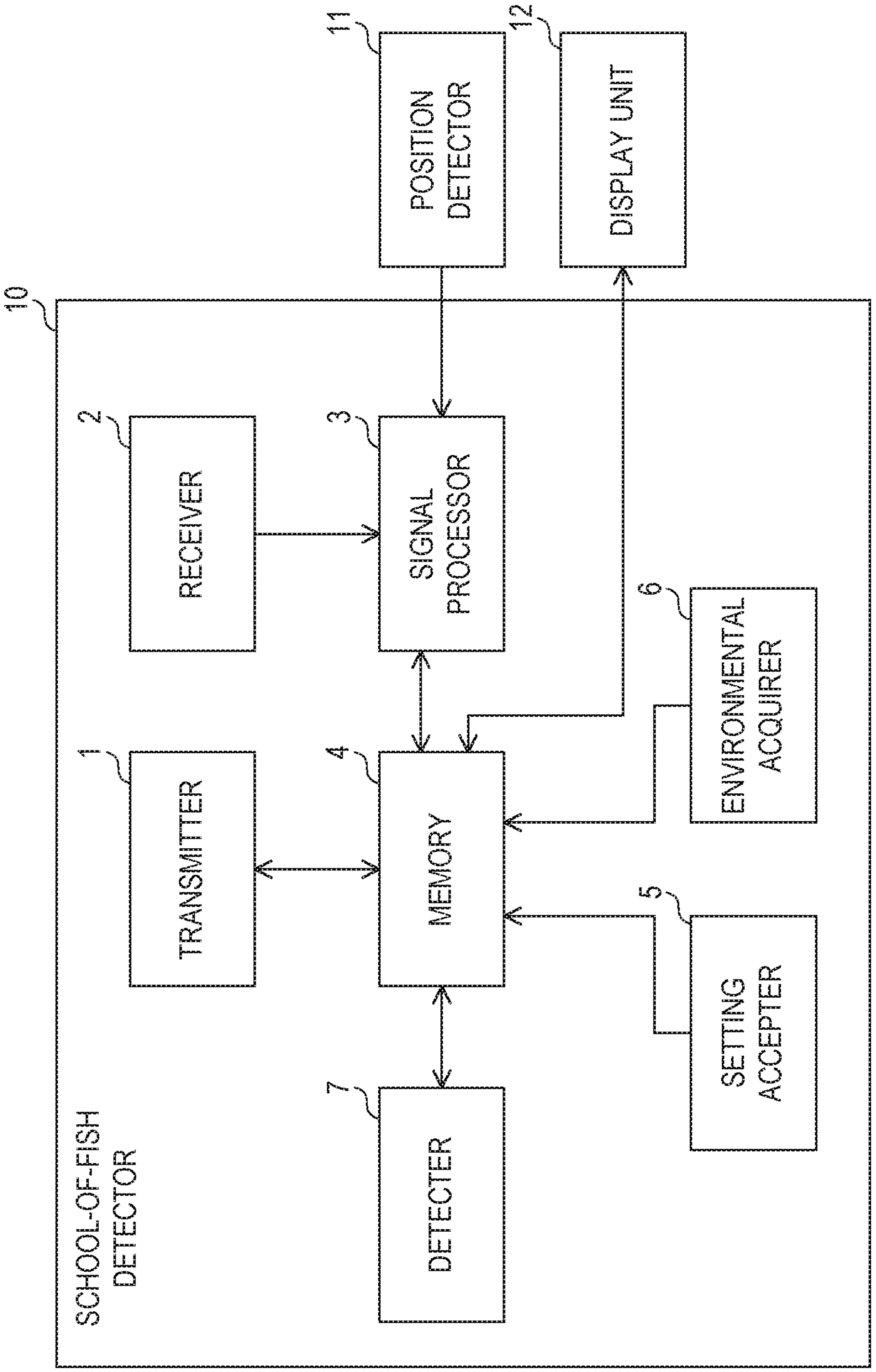
FIG. 2 is a view illustrating a configuration of a school-of-fish detector of the underwater detection device according to the first embodiment of the present disclosure.

FIG. 2 is a view illustrating a configuration of the school-of-fish detector of the underwater detection device according to the first embodiment of the present disclosure.

Referring to FIG. 2, the school-of-fish detector 10 may include a transmitter 1, a receiver 2, a signal processor (processing circuitry) 3, a memory 4, a setting accepter (a position setting accepter and a delimitation accepter) (user interface) 5, an environmental acquirer (a second acquirer) 6, and a detector 7.

The transmitter 1 periodically or irregularly may generate, for example, a transmission signal, which is an electrical signal, according to a given transmitting condition of a transmission wave, and convert the generated transmission signal into a transmission wave, which is an ultrasonic wave, using an oscillating element (not illustrated). Then, the transmitter 1 may transmit the converted transmission wave underwater. The transmitting condition may include, for example, a level, a pulse width, a frequency, and a frequency band (bandwidth) of the transmission wave.

The receiver 2 may receive the reflection wave of the transmission wave from underwater and convert the received reflection wave into a reception signal which is an electrical signal. The receiver 2 may also amplify the converted reception signal, and convert the reception signal which is an amplified analog signal into a digital signal. The receiver 2 may also calculate, for example, an echo level EL which is an intensity of the reception signal based on the converted digital signal, output to the signal processor 3 the calculated echo level EL, and reception information indicative of a reception time of the reflection wave.

The setting accepter 5 may receive a setting related to the transmitting condition of the transmission wave. For example, when a user inputs the transmitting condition through a keyboard or a mouse (not illustrated), the setting accepter 5 may save a condition information indicative of the inputted transmitting condition in the memory 4. Moreover, when an input of a new transmitting condition by the user or an automatic change of the transmitting condition is performed, the setting accepter 5 may update the transmitting condition indicated by the condition information saved in the memory 4 with the new transmitting condition.

Moreover, the setting accepter 5 may receive a setting of a first position P which is a position of the ship and is a position used as a reference. For example, the setting accepter 5 may save in the memory 4 first position information indicative of the latitude and longitude of the first position P which are set by the user.

Note that the first position P is desirable to be a position where the ship can receive the reflection wave from the seabed (bottom of a water body), i.e., a position where the reflection wave is not influenced by a school of fish etc.

Alternatively, the setting accepter 5 may accept only one of the setting related to the transmitting condition of the transmission wave and the setting of the first position P, without accepting both the settings.

The environmental acquirer 6 may periodically or irregularly acquire environment information indicative of an environment at the first position P related to at least any one of a depth from the sea surface to the seabed, a draft, tide times, a water temperature, a salt concentration, etc., and save the acquired environment information in the memory 4. Note that the environmental acquirer 6 may acquire environment information inputted by the user, or may receive environment information transmitted from an external device.

Moreover, when new environment information is acquired, the environmental acquirer 6 updates a part or all of the environment information saved in the memory 4 with the newly acquired environment information.

(Configuration of Signal Processor)

(a) Calculation and Correction of Signal Intensity TS

Figure 3:
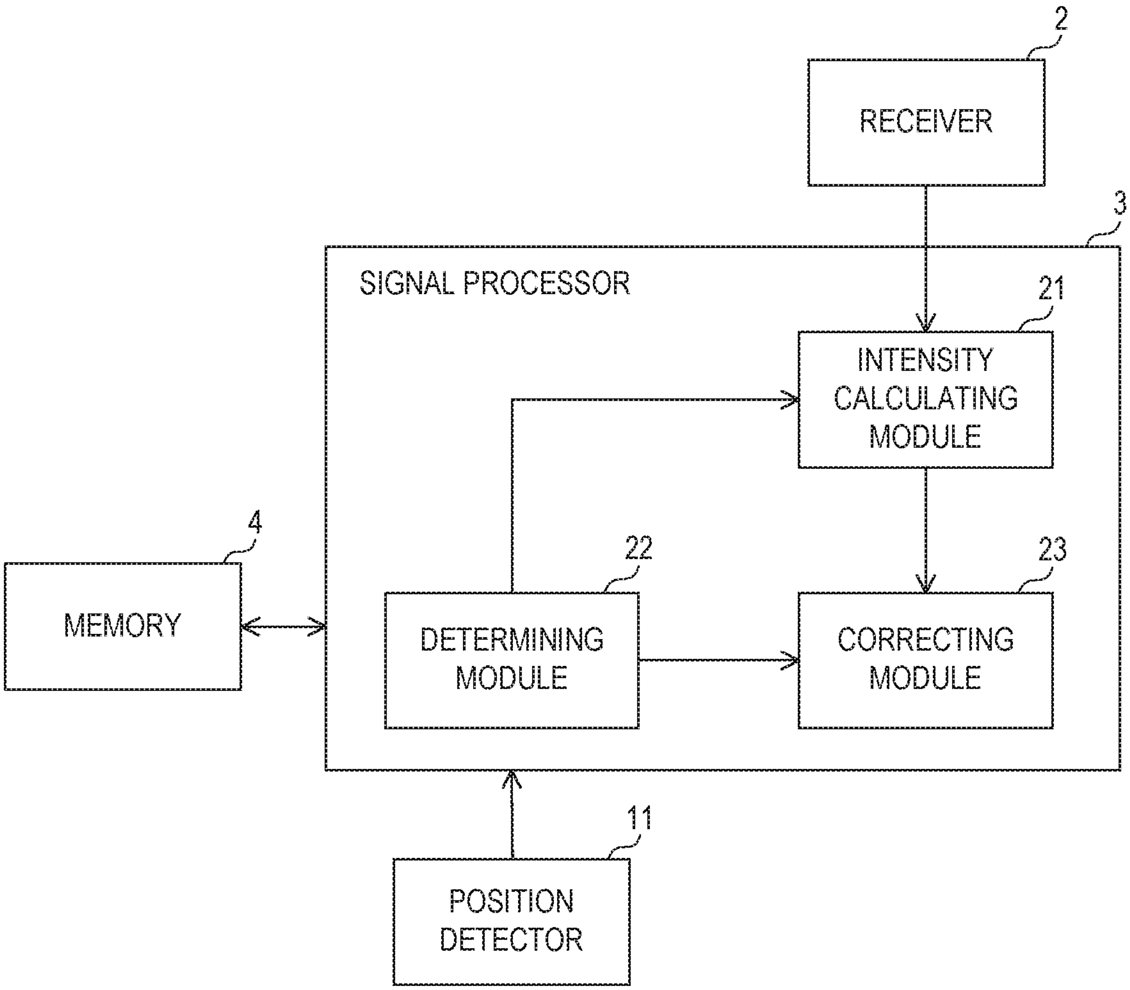
FIG. 3 is a view illustrating a configuration of a signal processor (processing circuitry) of the underwater detection device according to the first embodiment of the present disclosure.

FIG. 3 is a view illustrating a configuration of the signal processor of the underwater detection device according to the first embodiment of the present disclosure.

Referring to FIG. 3, the signal processor 3 may include an intensity calculating module (a first acquiring module) 21, a determining module 22, and a correcting module 23.

The intensity calculating module 21 may use the echo level EL indicated by the reception information received from the receiver 2 to calculate the signal intensity TS which is one example of the measurement result of the reflection wave corresponding to the echo level EL, and output to the correcting module 23 correction target information including the calculated signal intensity TS and the reception time indicated by the reception information.

In more detail, the intensity calculating module 21 may calculate the signal intensity TS according to the following Formula (1) based on the echo level EL and the environment information saved in the memory 4, and output the correction target information including the calculated signal intensity TS and the reception time to the correcting module 23.

$$TS=EL-KTR+40\times\log R+2\times\alpha\times R-120 \quad (1)$$

In Formula (1), KTR is a correction value relevant to hardware, R is a water depth, and a is a correlation coefficient relevant to the environment, such as the water temperature and the salt concentration. Each time the intensity calculating module 21 receives the new reception information from the receiver 2, it may perform the calculation of the signal intensity TS, and the output of the correction target information to the correcting module 23.

The correcting module 23 may correct the signal intensity TS indicated by each correction target information received from the intensity calculating module 21, based on the signal intensity TS at the ship position, and a first measurement value TS0 of the signal intensity TS at the first position P, when a relation between the ship position and the first position P satisfies a given condition.

Then, the correcting module 23 may save in the memory 4 signal intensity information indicative of, for example, the signal intensity TS after correction, the signal intensity TS before correction, the reception time indicated by the corresponding correction target information, the positional information received from the position detector 11, the environment indicated by the environment information saved in the memory 4, and the transmitting condition indicated by the condition information saved in the memory 4.

The detector 7 may detect an underwater target object, such as a school of fish, based on the plurality of signal intensity information saved in the memory 4.

(b) Calculation of First Measurement Value TS

In response to the positional information outputted from the position detector 11, the determining module 22 may determine whether a relation between the ship position indicated by the positional information and the first position P indicated by the first position information saved in the memory 4 satisfies a given condition. For example, if the ship position is in agreement with the first position P, the determining module 22 may determine that the relation between the ship position and the first position P satisfies the given condition. Moreover, the determining module 22 may notify the determination result to the intensity calculating module 21 and the correcting module 23.

Alternatively, the determining module 22 may determine that the relation between the ship position and the first position P satisfies the given condition, if a distance between the ship position and the first position P is below a given value. The given value may be arbitrarily set by the user, or may be a fixed value.

Alternatively, the determining module 22 may determine that the relation between the ship position and the first position P satisfies the given condition, if the ship position is within a range E including the first position P. The range E may be arbitrarily set by the user, or may be a given range.

If a notice indicating that the relation satisfies the given condition is received from the determining module 22, and reference information indicative of a correlation between the first position P and the reference value TS0 is not saved in the memory 4, the intensity calculating module 21 determines, for example, the calculated latest signal intensity TS as the first measurement value TS0.

Then, the intensity calculating module 21 may save in the memory 4 the reference information which includes, for example, the first measurement value TS0, the transmitting condition indicated by the condition information saved in the memory 4, and the environment indicated by the environment information saved in the memory 4. Hereinafter, the transmitting condition indicated by the reference information may also be referred to as the "reference transmitting condition," and the environment indicated by the reference information may also be referred to as the "reference environment."

Note that the intensity calculating module 21 may not be limited to be configured to acquire the correlation described above by determining the calculated latest signal intensity TS as the first measurement value TS0 when the notice indicating that the relation satisfies the given condition is received from the determining module 22 and the reference information is not saved in the memory 4.

For example, the intensity calculating module 21 may save the calculated signal intensity TS, and the reception time indicated by the reception information corresponding to the signal intensity TS in the memory 4, each time it received the notice indicating that the relation satisfies the given condition from the determining module 22. Then, the intensity calculating module 21 may determine the signal intensity TS, among the plurality of signal intensities TS saved in the memory 4, corresponding to the reception time same as the time set by the user, or the reception time included in the period set by the user, as the first measurement value TS0.

(c) Calculation of Correction Value A

After the reference information is saved in the memory 4, when the positional information is received from the position detector 11, the determining module 22 may similarly determine whether the relation between the ship position and the first position P indicated by the positional information satisfies the given condition, and then notify the determination result to the intensity calculating module 21 and the correcting module 23.

The correcting module 23 may calculate a correction value A used for the correction of the signal intensity TS in response to the relation satisfying the given condition. In more detail, if the correcting module 23 receives the notice indicating that the relation satisfies the given condition from the determining module 22, and the reference information is saved in the memory 4, the correcting module 23 may compare the current transmitting condition indicated by the condition information saved in the memory 4 with the reference transmitting condition indicated by the reference information.

Then, if the current transmitting condition is the same as the reference transmitting condition, the correcting module 23 may calculate the correction value A based on the signal intensity TS at the first position P indicated by the reception information received from the intensity calculating module 21, and the first measurement value TS0 indicated by the reference information, and save the calculated correction value A in the memory 4. In detail, the correcting module 23 may calculate a difference between the signal intensity TS and the first measurement value TS0 at the first position P as the correction value A.

Moreover, the correcting module 23 may perform the correction to add the correction value A to the signal intensity TS so that, for example, the signal intensity TS becomes the same value as the first measurement value TS0. Then, the correcting module 23 may save in the memory 4 the signal intensity information including the signal intensity TS after the correction at the first position P, the signal intensity TS before the correction at the first position P, the reception time indicated by the correction target information, the environment information saved in the memory 4, and the positional information received from the position detector 11.

Moreover, the correcting module 23 may save the calculated correction value A in the memory 4. If the correction value A has already been saved in the memory 4, the correcting module 23 may update the correction value A in the memory 4 with a newly calculated correction value A.

Moreover, when the correcting module 23 receives from the determining module 22 the notice indicating that the relation does not satisfy the given condition, it may correct the signal intensity TS indicated by the correction target information received from the intensity calculating module 21, using the correction value A saved in the memory 4, as described in "(a) Calculation and Correction of Signal Intensity TS." Then, the correcting module 23 may save in the memory 4 the signal intensity information including the corrected signal intensity TS, the signal intensity TS before the correction, and the reception time indicated by the correction target information, the environment information saved in the memory 4, and the positional information received from the position detector 11.

Moreover, if the current transmitting condition differs from the reference transmitting condition indicated by the reference information saved in the memory 4, the correcting module 23 may not perform the calculation and the update of the correction value A, but notify the display unit 12 that the transmitting condition differs.

Alternatively, the correcting module 23 may correct the signal intensity TS, for example, based on a ratio of the signal intensity TS to the first measurement value TS0.

Modification 1

The correcting module 23 may change the current transmitting condition to the reference transmitting condition, if the current transmitting condition differs from the reference transmitting condition.

In more detail, the correcting module 23 may update the current transmitting condition to the reference transmitting condition, if the notice indicating that the relation satisfies the given condition is received from the determining module 22, the reference information is saved in the memory 4, and the current transmitting condition differs from the reference transmitting condition indicated by the reference information. Then, the correcting module 23 may calculate the correction value A based on the signal intensity TS at the first position P indicated by the correction target information received from the intensity calculating module 21 after the change of the transmitting condition, and the first measurement value TS0 indicated by the reference information.

Modification 2

The correcting module 23 may notify the intensity calculating module 21 that the current transmitting condition differs from the reference transmitting condition, if the current transmitting condition differs from the reference transmitting condition. In this case, the intensity calculating module 21 may calculate, for example, a new first measurement value TS0, in response to the notice from the correcting module 23.

In detail, if the intensity calculating module 21 receives from the determining module 22 the notice indicating that the relation satisfies the given condition and receives from the correcting module 23 the notice indicating that the current transmitting condition differs from the reference transmitting condition, and the reference information is saved in the memory 4, it may then determine the calculated latest signal intensity TS as the first measurement value TS0.

Then, the intensity calculating module 21 may save in the memory 4 the reference information indicative of the first measurement value TS0, the reference transmitting condition, and the reference environment. Therefore, in the memory 4, the reference information may be saved for every transmitting condition.

Moreover, in this case, if the correcting module 23 receives from the determining module 22 the notice indicating that the relation satisfies the given condition, it may classify the signal intensity TS indicated by the correction target information received from the intensity calculating module 21 into any one of a plurality of groups, according to the transmitting condition indicated by the latest condition information at a timing when the correction target information is received.

Then, the correcting module 23 may perform the correction based on the first measurement value TS0 for every group. That is, the correcting module 23 may identify, among the plurality of reference information saved in the memory 4, the reference information indicative of the reference transmitting condition of the contents same as the transmitting condition corresponding to the corresponding group, and correct the classified signal intensity TS by using the first measurement value TS0 indicated by the identified reference information.

Modification 3

The correcting module 23 is not limited to configured to perform the calculation and the update of the correction value A in response to the relation satisfying the given condition. For example, the correcting module 23 may perform the calculation and the update of the correction value A, if the notice indicating that the relation satisfies the given condition is received from the determining module 22, the reference information is saved in the memory 4, and a given operation is performed by the user.

Modification 4

If the correcting module 23 receives from the determining module 22 the notice indicating that the relation satisfies the given condition, the signal intensity TS indicated by the correction target information received from the intensity calculating module 21 may be classified into any one of a plurality of groups according to the environment indicated by the latest environment information at the timing when the correction target information is received.

In this case, in the memory 4, a plurality of reference information respectively indicating a plurality of different reference environments may be saved. Then, the determining module 23 may identify, among the plurality of reference information saved in the memory 4, the reference information indicative of the reference environment of the contents same as the environment corresponding to a certain group, and correct the signal intensity TS belonging to the group by using the first measurement value TS0 indicated by the identified reference information.

Modification 5

The intensity calculating module 21 may output, for example, the correction target information indicative of the echo level EL to the correcting module 23, instead of the signal intensity TS. In this case, the intensity calculating module 21 may calculate the first measurement value EL0 of the echo level EL at the first position P, instead of the first measurement value TS0 of the signal intensity TS at the first position, and save the calculated reference information indicative of the first measurement value EL0 in the memory 4. Then, the correcting module 23 may perform the calculation and the update of the correction value A, and the correction of the echo level EL, based on the echo level EL indicated by the correction target information received from the intensity calculating module 21, and the first measurement value EL0 indicated by the reference information saved in the memory 4.

(c) Display Unit

Figure 4:
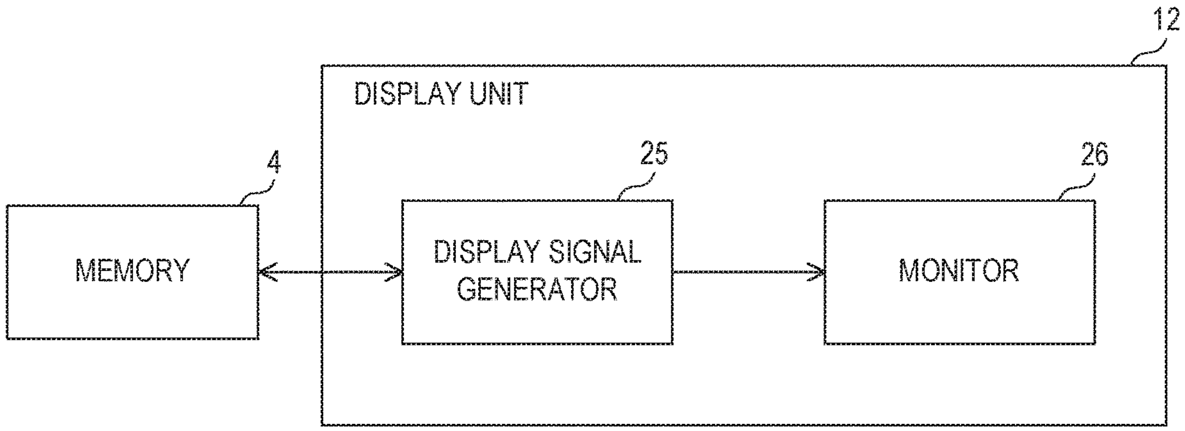
FIG. 4 is a view illustrating a configuration of a display unit of the underwater detection device according to the first embodiment of the present disclosure.
Figure 5:
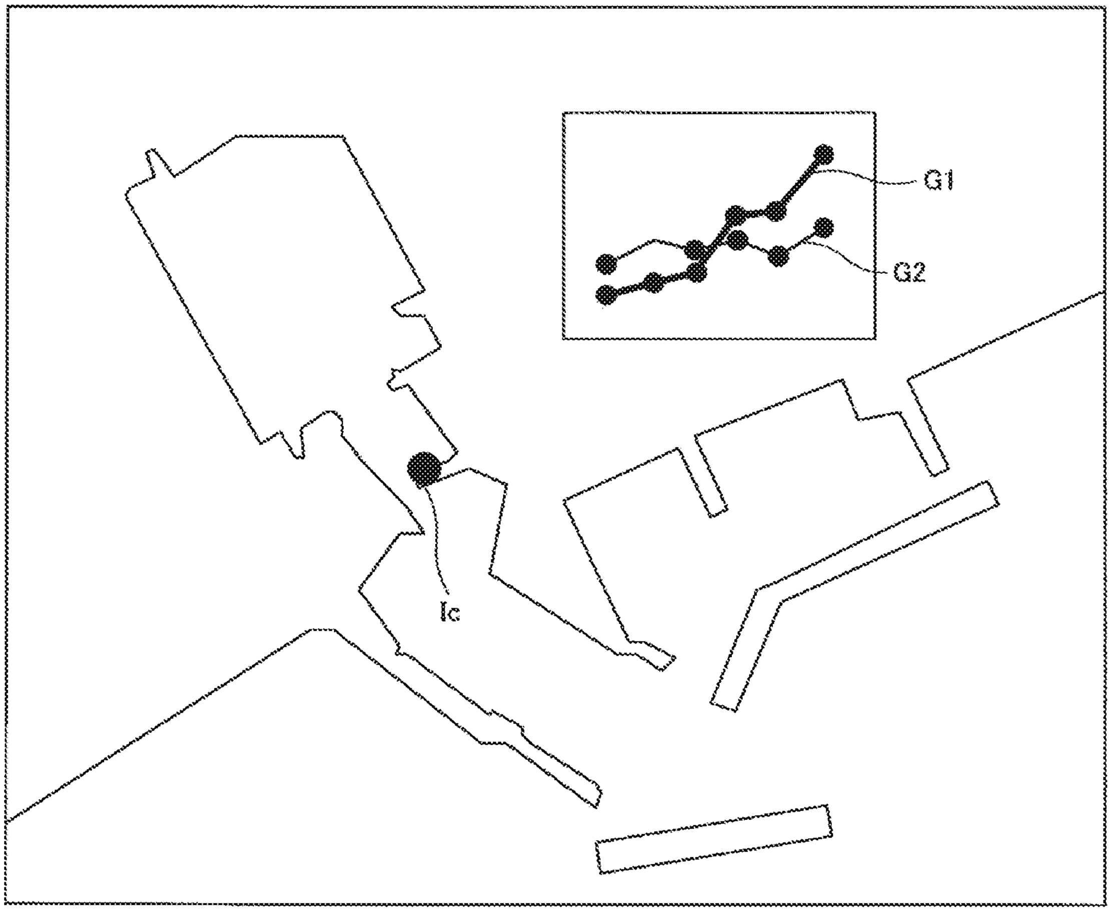
FIG. 5 is a view illustrating one example of a screen displayed on the display unit of the underwater detection device according to the first embodiment of the present disclosure.

FIG. 4 is a view illustrating a configuration of the display unit of the underwater detection device according to the first embodiment of the present disclosure. FIG. 5 is a view illustrating one example of the screen displayed on the display unit of the underwater detection device according to the first embodiment of the present disclosure.

Referring to FIGS. 4 and 5, the display unit 12 may include a display signal generator (processing circuitry) 25 and a monitor 26. The display signal generator 25 may generate a display signal of the screen where an icon Ic indicative of the first position P is superimposed on a nautical chart, with reference to the first position information saved in the memory 4 of the school-of-fish detector 10, for example, in response to operation performed by the user. Then, the display signal generator 25 may display the screen on the monitor 26 by outputting the generated display signal to the monitor 26.

Moreover, the display signal generator 25 may generate display signals of a graph G1 and a graph G2 with reference to the plurality of signal intensity information saved in the memory 4. Then, the display signal generator 25 may display the graph G1 and the graph G2 on the monitor 26 by outputting the generated display signals to the monitor 26.

The graph G1 illustrates, for example, a time series change of the signal intensity TS before the correction at the first position P. The graph G2 illustrates, for example, a time series change of a difference D between the signal intensity TS before the correction at the first position P and the previously-calculated signal intensity TS before the correction at the first position P.

As illustrated in the graph G1, the signal intensity TS before the correction at the first position P tends to increase with time, influenced by the aged deterioration etc. of the oscillating element of the school-of-fish detector 10. On the other hand, as illustrated in the graph G2, the difference D may not change much. By the configuration in which the graphs G1 and G2 are displayed, a degree of the aged deterioration etc. of the school-of-fish detector 10 can easily be grasped visually by the user.

Note that, if the signal intensity information indicative of the signal intensity TS before the correction of which the difference from the first measurement value TS0 is above a given value exists among the plurality of signal intensity information saved in the memory 4, the display signal generator 25 may warn the user by displaying a corresponding part of the graph G1 in a different appearance from other parts, such as changing the display color to exaggerate the part, or performing a given output.

Alternatively, the display signal generator 25 may further generate a display signal of the contents of the environment information included in each of one or more signal intensity information saved in the memory 4, and display the contents on the monitor 26.

Alternatively, the display signal generator 25 may further generate a display signal indicative of a difference between the environment when the reflection wave is received, which corresponds to the first measurement value TS0, and the environment when the reflection wave is received, which corresponds to the signal intensity TS at the first position P, and display the difference on the monitor 26. In detail, for example, when a difference between a depth indicated by the reference information and a depth at the first position P indicated by the latest signal intensity information is above a given value, the display signal generator 25 may display the depth in a different appearance from other parts so that the depth difference is exaggerated, or display a given message.

Alternatively, when a notice indicating that the current transmitting condition differs from the reference transmitting condition indicated by the reference information saved in the memory 4 is received from the correcting module 23, the display signal generator 25 may display a message indicative of the contents of the notice.

Alternatively, the display unit 12 may be provided to a device which is separate from the school-of-fish detector 10 and the position detector 11.

[Procedure of Operation]

The underwater detection device 101 may be provided with a computer including a memory, and a processor (processing circuitry), such as a CPU in the computer, may read from the memory a program including a part or all of steps of the following flowchart and execute the program. The program of the underwater detection device 101 may be installed from an external device. Moreover, the program of the underwater detection device 101 may be distributed in a state where it is stored in a recording medium.

(Calculation of First Measurement Value TS0)

Figure 6:
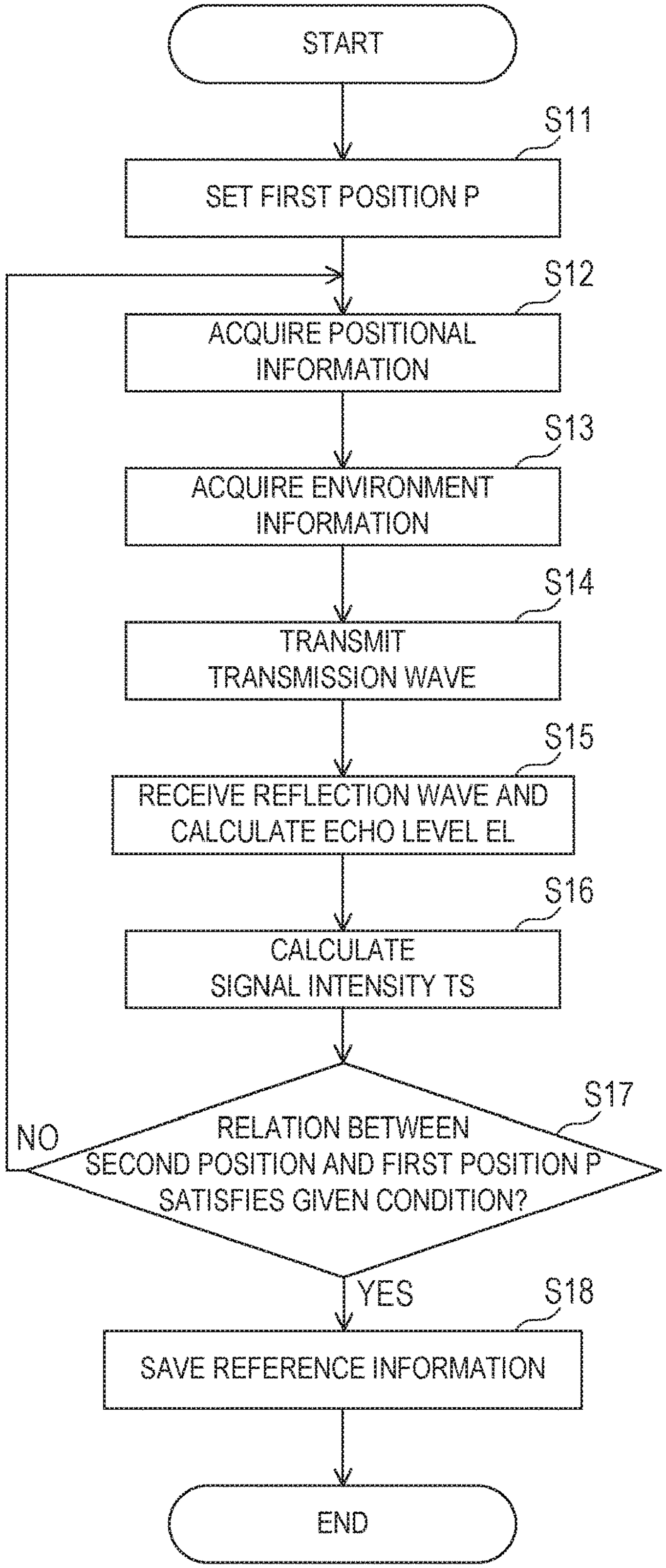
FIG. 6 is a flowchart illustrating a procedure of a calculation of a first measurement value by the underwater detection device according to the first embodiment of the present disclosure.

FIG. 6 is a flowchart illustrating a procedure of a calculation of the first measurement value by the underwater detection device according to the first embodiment of the present disclosure.

Referring to FIG. 6, the setting accepter 5 of the underwater detection device 101 first may receive, for example, a setting of the first position P, and save in the memory 4 the first position information indicative of the first position P inputted by the user (Step S11).

Next, the position detector 11 may detect the current position of the ship, and output the positional information indicative of the detected position and the time of the detection to the school-of-fish detector 10 (Step S12).

Next, the environmental acquirer 6 may acquire the environment information, and save the acquired environment information in the memory 4 (Step S13).

Next, the transmitter 1 may transmit the transmission wave underwater (Step S14). Next, the receiver 2 may receive the reflection wave of the transmission wave from underwater, and calculate the echo level EL of the received reflection wave. Then, the receiver 2 may output the reception information indicative of the calculated echo level EL and the reception time of the reflection wave to the signal processor 3 (Step S15).

Next, the intensity calculating module 21 of the signal processor 3 may calculate the signal intensity TS based on the echo level EL indicated by the reception information and the environment information saved in the memory 4, in response to the reception information from the receiver 2. Then, the intensity calculating module 21 may output the correction target information indicative of the calculated signal intensity TS to the correcting module 23 (Step S16).

Next, the determining module 22 may determine whether the relation between the ship position indicated by the positional information received from the position detector 11 and the first position P indicated by the first position information saved in the memory 4 satisfies the given condition, and then notify the determination result to the intensity calculating module 21 and the correcting module 23 (Step S17).

Next, if the intensity calculating module 21 receives the notice indicating that the relation satisfies the given condition from the determining module 22 ("YES" at Step S17), it may then determine the signal intensity TS indicated by the latest correction target information received from the intensity calculating module 21 as the first measurement value TS0. Then, the correcting module 23 may save in the memory 4 the reference information including the first measurement value TS0, the reference transmitting condition indicated by the condition information saved in the memory 4, and the reference environment indicated by the environment information saved in the memory 4 (Step S18).

On the other hand, if the intensity calculating module 21 receives the notice indicating that the relation does not satisfy the given condition from the determining module 22 in a situation where the reference information is saved in the memory 4 ("NO" at Step S17), it may again perform the operation at and after Step S12, without acquiring the reference information.

(Procedure of Correction of Signal Intensity TS)

Figure 7:
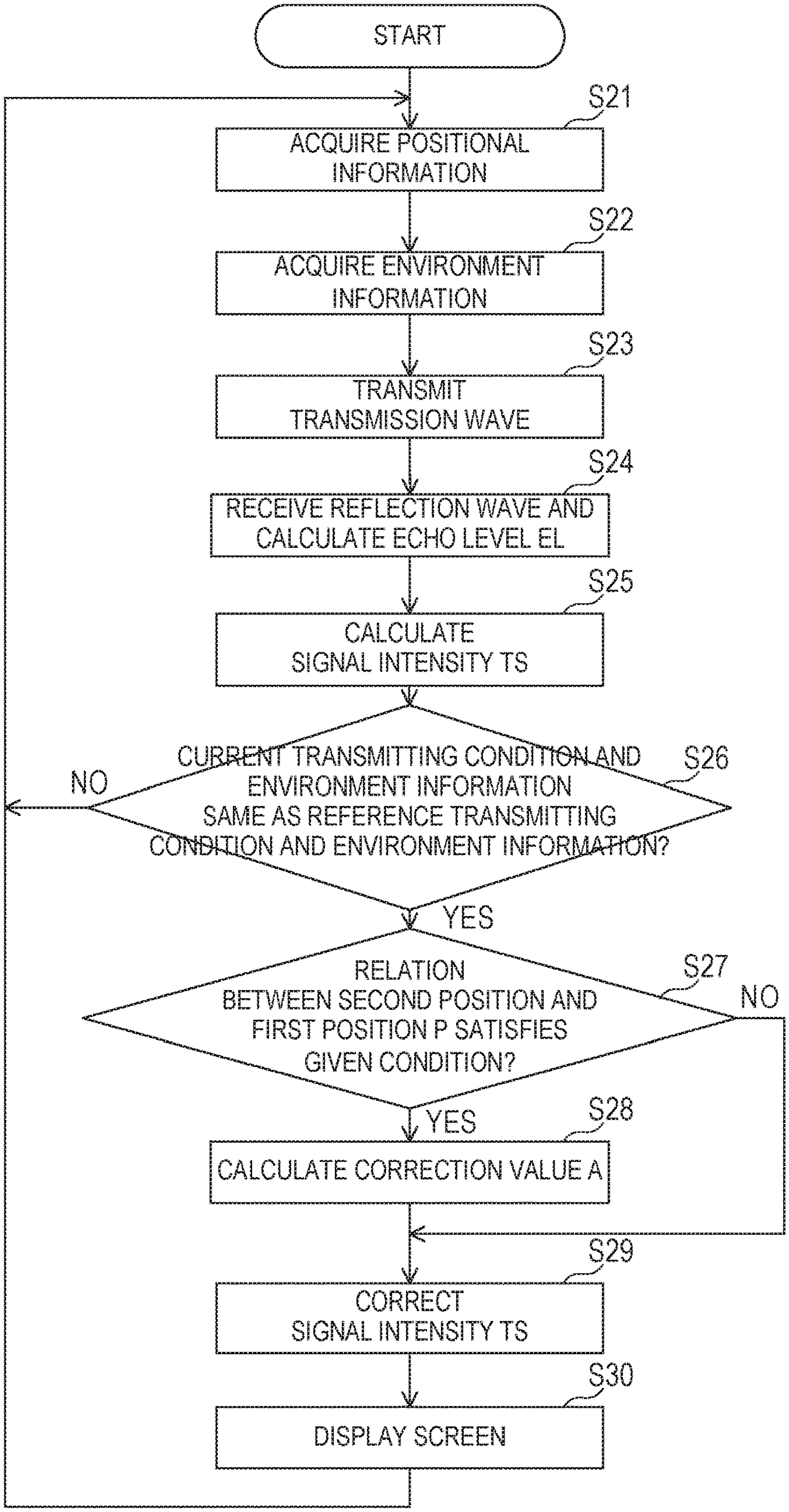
FIG. 7 is a flowchart illustrating a procedure of a correction of a signal intensity by the underwater detection device according to the first embodiment of the present disclosure.

FIG. 7 is a flowchart illustrating a procedure of the correction of the signal intensity by the underwater detection device according to the first embodiment of the present disclosure.

Referring to FIG. 7, the position detector 11 may first detect the current position of the ship, and output the positional information indicative of the detected position and the time of the detection to the school-of-fish detector 10 (Step S21).

Next, the environmental acquirer 6 may acquire the environment information, and save the acquired environment information in the memory 4 (Step S22).

Next, the transmitter 1 may transmit the transmission wave underwater (Step S23). Next, the receiver 2 may receive the reflection wave of the transmission wave from underwater, and calculate the echo level EL of the received reflection wave. Then, the receiver 2 may output the reception information indicative of the calculated echo level EL and the reception time of the reflection wave to the signal processor 3 (Step S24).

Next, the intensity calculating module 21 of the signal processor 3 may calculate the signal intensity TS based on the echo level EL indicated by the reception information and the environment information saved in the memory 4, in response to the reception information from the receiver 2. Then, the intensity calculating module 21 may output the correction target information indicative of the calculated signal intensity TS to the correcting module 23 (Step S25).

Next, the correcting module 23 may compare the current transmitting condition indicated by the condition information with the reference transmitting condition indicated by the reference information, which are saved in the memory 4 (Step S26).

Here, the determining module 22 may determine, for example, periodically, whether the relation between the ship position indicated by the positional information received from the position detector 11 and the first position P indicated by the first position information saved in the memory 4 satisfies the given condition, and notify the determination result to the intensity calculating module 21 and the correcting module 23.

Next, if the current transmitting condition is the same as the reference transmitting condition ("YES" at Step S26), and if the notice indicating that the relation satisfies the given condition is received from the determining module 22 ("YES" at Step S27), the correcting module 23 may calculate the correction value A based on the signal intensity TS at the first position P indicated by the correction target information received from the intensity calculating module 21 and the first measurement value TS0 indicated by the reference information (Step S28). Note that, if the correction value A has already been saved in the memory 4, the correcting module 23 may update the correction value A in the memory 4 with the newly calculated correction value A.

Next, the correcting module 23 may correct the signal intensity TS using the calculated correction value A. Then, the correcting module 23 may save the signal intensity information including the corrected signal intensity TS in the memory 4 (Step S29).

On the other hand, if the correcting module 23 receives the notice indicating that the relation does not satisfy the given condition from the determining module 22 ("NO" at Step S27), it may not calculate the new correction value A (Step S28), and may correct the signal intensity TS indicated by the correction target information received from the intensity calculating module 21, for example, using the correction value A which has already been saved in the memory 4. Then, the correcting module 23 may save the signal intensity information including the corrected signal intensity TS in the memory 4 (Step S29).

Next, the display signal generator 25 of the display unit 12 may display the screen based on the first position information and the plurality of signal intensity information which are saved in the memory 4, for example, in response to the given operation performed by the user.

In detail, the display signal generator 25 may display on the monitor 26, for example, the screen where the icon Ic indicative of the first position P is superimposed on the nautical chart, the graph G1 indicative of the time series change of the signal intensity TS before the correction at the first position P, and the graph G2 indicative of the time series change of the difference D between the signal intensity TS before the correction at the first position P and the previous signal intensity TS before the correction at the first position P calculated immediately before the signal intensity TS (Step S30).

Moreover, if the current transmitting condition indicated by the condition information saved in the memory 4 differs from the reference transmitting condition indicated by the reference information ("NO" at Step S26), the correcting module 23 may not operate Steps S27 to S29.

Alternatively, if the current transmitting condition differs from the reference transmitting condition ("NO" at Step S26), the correcting module 23 may newly calculate the first measurement value TS0, and save the reference information indicative of the newly calculated first measurement value TS0, the current transmitting condition, and the current environment in the memory 4.

Modification of First Embodiment

The correcting module 23 of the underwater detection device 101 according to the first embodiment described above may correct the signal intensity TS as the correction of the measurement result of the reflection wave. On the other hand, the display signal generator 25 (the first acquiring module and the correcting module) of the underwater detection device 101 according to a modification of the first embodiment may correct the display signal indicative of the measurement result of the reflection wave.

Figure 8:
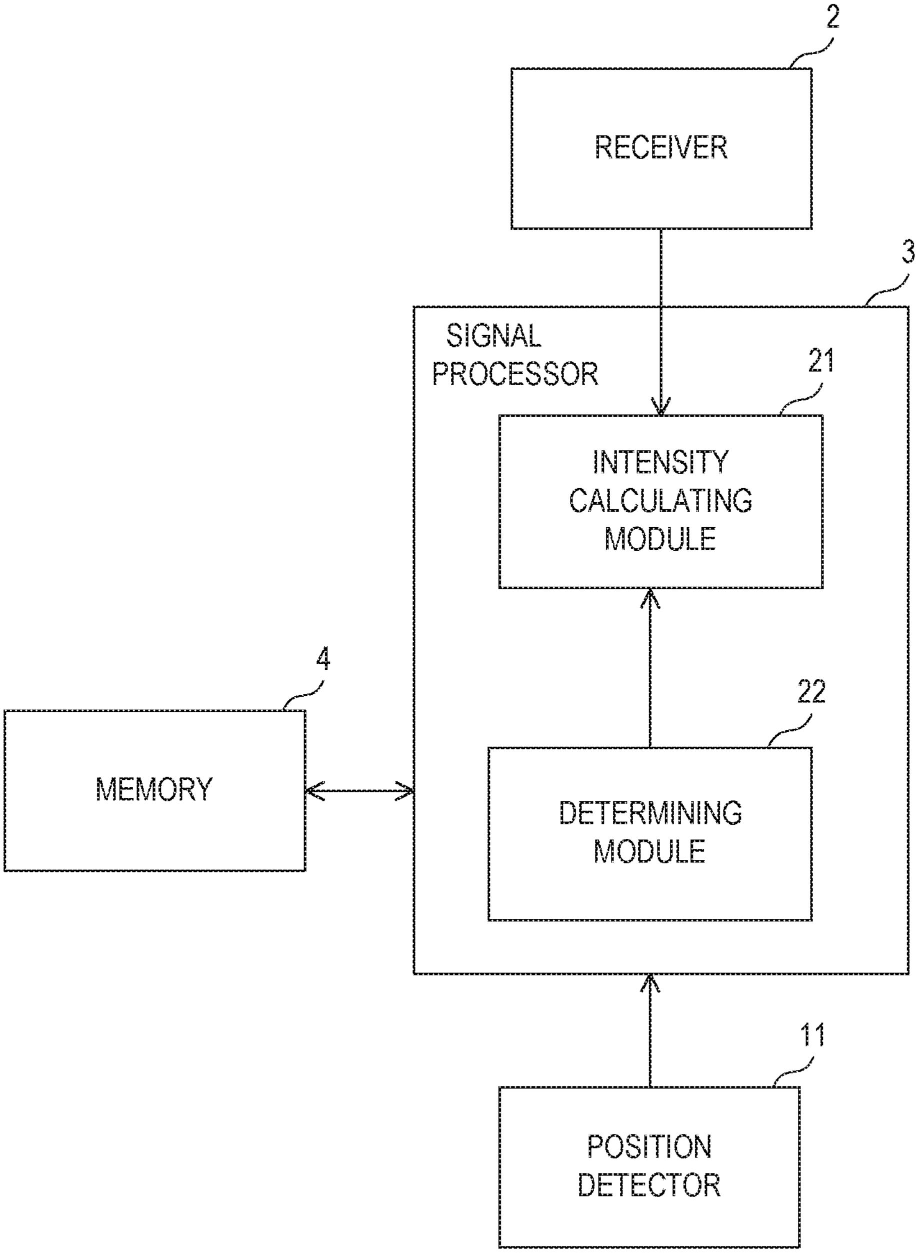
FIG. 8 is a view illustrating a configuration of a signal processor of the underwater detection device according to a modification of the first embodiment of the present disclosure.

FIG. 8 is a view illustrating a configuration of the signal processor of the underwater detection device according to the modification of the first embodiment of the present disclosure.

Referring to FIG. 8, the signal processor 3 may include the intensity calculating module 21 and the determining module 22.

The intensity calculating module 21 may calculate the signal intensity TS which is one example of the measurement result of the reflection wave corresponding to the echo level EL by using the echo level EL indicated by the reception information received from the receiver 2. Moreover, the intensity calculating module 21 may save in the memory 4, in response to the positional information outputted from the position detector 11, the signal intensity information including the ship position indicated by the positional information, the calculated signal intensity TS, and the reception time indicated by the reception information.

The determining module 22 may determine, in response to the positional information outputted from the position detector 11, whether the relation between the ship position indicated by the positional information and the first position P indicated by the first position information saved in the memory 4 satisfies the given condition. For example, if the ship position is in agreement with the first position P, the determining module 22 may determine that the relation between the ship position and the first position P satisfies the given condition. Moreover, the determining module 22 may notify the determination result to the intensity calculating module 21.

If the notice indicating that the relation satisfies the given condition is received from the determining module 22, and the reference information is not saved in the memory 4, the intensity calculating module 21 saves, for example, the reference information indicative of the calculated latest signal intensity TS in the memory 4.

Moreover, if the notice indicating that the relation satisfies the given condition is received from the determining module 22, and the reference information is saved in the memory 4, the intensity calculating module 21 saves in the memory 4, for example, first position intensity information indicative of a second measurement value which is the calculated latest signal intensity TS.

Referring again to FIG. 4, the display unit 12 according to the modification of the first embodiment of the present disclosure may include the display signal generator 25 as the correcting module, and the monitor 26.

For example, in response to a given operation performed by the user, the display signal generator 25 may display the screen indicative of the measurement result of the reflection wave on the monitor 26 based on the plurality of signal intensity information and the plurality of first position intensity information which are saved in the memory 4 of the school-of-fish detector 10.

In more detail, the display signal generator 25 may determine, for example, an upper limit and a lower limit of a range which includes the signal intensity TS indicated by the reference information saved in the memory 4 as first measurement values. Moreover, the display signal generator 25 may subdivide the range from the determined upper limit to lower limit into a plurality of subranges.

Then, the display signal generator 25 may generate a display signal of the screen for every signal intensity information saved in the memory 4, for example, where colors according to the subranges are superimposed on corresponding parts of the nautical chart. Then, the display signal generator 25 may output the generated display signal to the monitor 26 to display the screen on the monitor 26.

In detail, suppose that the upper limit which is the first measurement value is −30 dB, and the lower limit which is the first measurement value is −70 dB. In this case, the display signal generator 25 may subdivide the range from −30 dB to −70 dB including the signal intensity TS into a given number of subranges, and display on the monitor 26, for every signal intensity information, the measurement result of the reflection wave by the colors according to the subranges. Note that, the display signal generator 25 may display the measurement result of the reflection wave by a given color when the signal intensity TS is more than −30 dB, and display the measurement result of the reflection wave by another given color when the signal intensity TS is less than −70 dB.

Moreover, when the first position intensity information is newly saved in the memory 4, the display signal generator 25 may correct the display signal based on the range including the signal intensity TS indicated by the first position intensity information, and the first measurement value.

In detail, suppose that the range including the signal intensity TS indicated by the newly saved first position intensity information is −35 dB to −80 dB. In this case, the display signal generator 25 may subdivide the range of −35 dB to −80 dB including the signal intensity TS into a given number of subranges, and correct the display signal so that the measurement result of the reflection wave is displayed for every signal intensity information by the colors according to the subranges.

Meanwhile, since the detection sensitivity of the target object by the underwater detection device varies due to the influences of the aged deterioration etc. of the transducer, it is often difficult to continue the accurate detection of the target object for a long period of time. For example, in order to maintain the detection sensitivity of the target object, the user may manually adjust the oscillating element in the transducer, but it may be difficult to perform the adjustment accurately.

On the other hand, in the underwater detection device 101 according to the first embodiment of the present disclosure, the transmitter 1 may transmit the transmission wave. The receiver 2 may receive the reflection wave of the transmission wave. The intensity calculating module 21 may acquire the first position P which is the position used as a reference, and the first measurement value TS0 which is the measurement result of the reflection wave at the first position P received by the receiver 2. The determining module 22 may determine whether the relation between the ship position and the first position P satisfies the given condition. Moreover, the correcting module 23 may correct the measurement result of the reflection wave received by the receiver 2 based on the second measurement value which is the measurement result of the reflection wave received by the receiver 2 at the ship position when the relation satisfies the given condition, and the first measurement value TS0.

According to such a configuration, the measurement result of the reflection wave at the first position P may be acquired, for example, each time the ship passes through the first position P, and the correction of the measurement result of the reflection wave when the ship travels locations other than the first position P may be performed using the acquired measurement result, thereby obtaining the measurement result with the reduced influences of the aged deterioration etc. of the oscillating element in the transmitter 1.

Therefore, the underwater detection device 101 according to the first embodiment of the present disclosure can continue the accurate detection of the target object for a long period of time.

Moreover, in the underwater detection device 101 according to the first embodiment of the present disclosure, the correcting module 23 may perform the correction based on the correction value A so that the second measurement value becomes substantially the identical value as the first measurement value TS0.

According to such a configuration, the correction value A can be calculated without performing a complicated calculation etc., and the correction using the calculated correction value A can be performed.

Moreover, in the underwater detection device 101 according to the first embodiment of the present disclosure, the correcting module 23 may calculate the correction value A based on the difference or ratio of the second measurement value and the first measurement value TS0.

According to such a configuration, the correction value A can be calculated more simply.

Moreover, in the underwater detection device 101 according to the first embodiment of the present disclosure, the determining module 22 may determine that the relation satisfies the given condition when the distance between the ship position and the first position P is below the given value. Moreover, the setting accepter 5 may accept the setting of the given value.

According to such a configuration, the range of the ship position where the relation is determined as satisfying the given condition can be set arbitrarily. Moreover, the frequency of determining that the relation satisfies the given condition can be, for example, increased, and thereby, the updating frequency of the correction value A can be increased and a more accurate correction can be performed.

Moreover, in the underwater detection device 101 according to the first embodiment of the present disclosure, the correcting module 23 may classify the measurement result of the reflection wave at the ship position into the plurality of groups according to the transmitting condition of the transmission wave, and perform the correction based on the first measurement value TS0 for every group.

According to such a configuration, for example, since the first measurement value TS0 can be calculated for every transmitting condition of the transmission wave and the correction can be performed based on the first measurement value TS0 according to the measurement result of the reflection wave to be corrected, a further accurate correction can be performed.

Moreover, in the underwater detection device 101 according to the first embodiment of the present disclosure, the transmitting condition may be at least any one of the level, the pulse width, the frequency, and the frequency band of the transmission wave.

Thus, according to the configuration of classifying the measurement results of the reflection waves into the plurality of groups according to at least any one the level, the pulse width, the frequency, and the frequency band of the transmission wave, a suitable grouping can be performed.

Moreover, in the underwater detection device 101 according to the first embodiment of the present disclosure, the second measurement value may be the measurement result of the reflection wave reflected on the seabed.

According to such a configuration, since the correction can be performed using the first measurement value TS0 for every one of the various transmitting conditions of the transmission wave, a further accurate correction can be performed.

Moreover, in the underwater detection device 101 according to the first embodiment of the present disclosure, the setting accepter 5 may accept the setting of the first position P.

According to such a configuration, the first position P can be set arbitrarily.

Moreover, in the underwater detection device 101 according to the first embodiment of the present disclosure, the correcting module 23 may calculate the correction value A based on the second measurement value and the first measurement value TS0, and perform the correction using the calculated correction value A. Moreover, the correcting module 23 may calculate the correction value A in response to the relation satisfying the given condition.

According to such a configuration, the correction value A can be updated automatically each time the ship position satisfies the given condition.

Moreover, in the underwater detection device 101 according to the first embodiment of the present disclosure, the first measurement value TS0 may be the measurement result of the reflection wave received by the receiver 2 at a given time or during a given period, among the plurality of reflection waves received by the ship.

According to such a configuration, the measurement result of the reflection wave received at the arbitrary time or during the arbitrary period can be used as the first measurement value TS0.

Moreover, in the underwater detection device 101 according to the first embodiment of the present disclosure, the display signal generator 25 may generate the display signal of the graph G1 indicative of the time series change of the second measurement value.

According to such a configuration, for example by displaying the time series change of the second measurement value before the correction, the degradation etc. of the oscillating element in the transmitter 1 can easily be grasped visually by the user.

Moreover, in the underwater detection device 101 according to the first embodiment of the present disclosure, the environmental acquirer 6 may acquire the environment information indicative of the environment related to at least any one of the depth, the draft, and the tides at the first position P. Moreover, the display signal generator 25 may further generate the display signal indicative of the difference between the environment indicated by the environment information when the reflection wave is received, corresponding to the first measurement value TS0, and the environment indicated by the environment information when the reflection wave is received, corresponding to the second measurement value.

According to such a configuration, the difference between the environment when the reflection wave is received, corresponding to the first measurement value TS0, and the environment when the reflection wave is received, corresponding to the second measurement value, can easily be grasped visually by the user.

Moreover, in the underwater detection method of the underwater detection device 101 according to the first embodiment of the present disclosure, which transmits the transmission wave and receives the reflection wave of the transmission wave, the intensity calculating module 21 may first acquire the first position P which is the position used as the reference, and the first measurement value TS0 which is the measurement result of the reflection wave at the first position P received by the receiver 2. Next, the determining module 22 may determine whether the relation between the ship position and the first position P satisfies the given condition. Next, the correcting module 23 may correct the measurement result of the reflection wave received by the receiver 2 based on the second measurement value which is the measurement result of the reflection wave received by the receiver 2 at the ship position when the relation satisfies the given condition, and the first measurement value TS0.

According to such a method, for example, the measurement result of the reflection wave at the first position P is acquired each time the ship passes through the first position P, the correction of the measurement result of the reflection wave when the ship travels locations other than the first position P can be performed using the acquired measurement result, and the measurement result with the reduced influences of the aged deterioration etc. of the oscillating element in the transmitter 1 can be obtained.

Therefore, in the underwater detection method according to the first embodiment of the present disclosure, the accurate detection of the target object can be continued for a long period of time.

Next, another embodiment of the present disclosure is described with reference to the accompanying drawings. Note that the same reference characters are given to the same or corresponding components throughout the figures to omit redundant description.

Second Embodiment

In the underwater detection device 101 according to the first embodiment of the present disclosure described above, the correcting module 23 may perform the correction using the first measurement value TS0 which is the measurement result of the reflection wave received by the ship at the first position P. On the other hand, in an underwater detection device 102 according to the second embodiment of the present disclosure, the correcting module 23 may perform a correction using a first measurement value TS0 which is a measurement result of the reflection wave received by another ship at a first position P.

[Configuration and Basic Operation]

Figure 9:
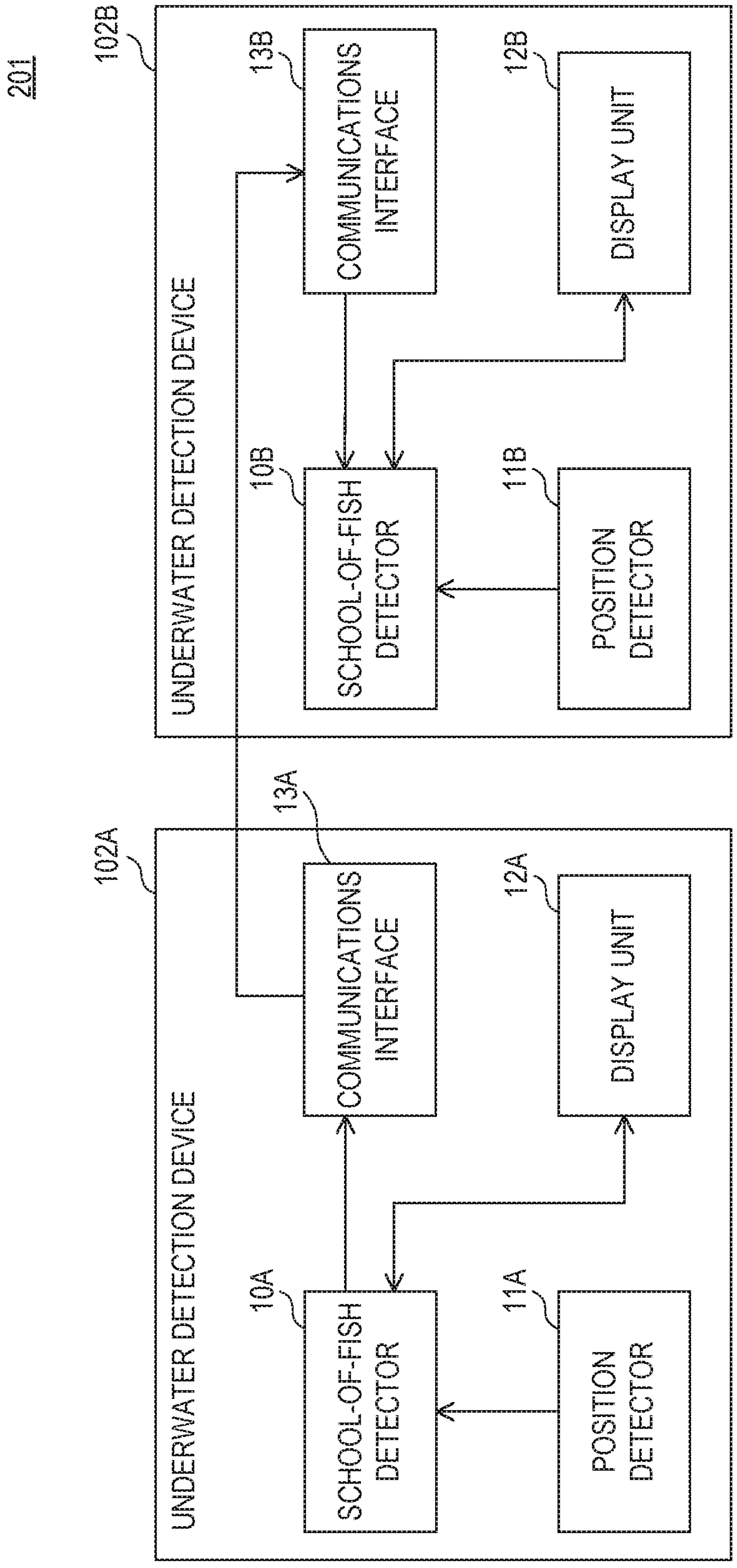
FIG. 9 is a view illustrating a configuration of an underwater detection system according to a second embodiment of the present disclosure.

FIG. 9 is a view illustrating a configuration of the underwater detection system according to the second embodiment of the present disclosure.

Referring to FIG. 9, the underwater detection system 201 may be provided with a plurality of underwater detection devices 102 provided to a plurality of ships, respectively. In FIG. 9, two underwater detection devices 102A and 102B are illustrated as one example.

(Underwater Detection Device 102A)

The underwater detection device 102A may include a school-of-fish detector 10A, a position detector 11A, a display unit 12A, and a communications interface 13A. The configurations and operations of the school-of-fish detector 10A, the position detector 11A, and the display unit 12A in the underwater detection device 102A may be similar to the configurations and operations of the school-of-fish detector 10, the position detector 11, and the display unit 12 in the underwater detection device 101 illustrated in FIG. 1, respectively, except for the followings.

When calculating the first measurement value TS0, the school-of-fish detector 10A may hold the reference information including the first measurement value TS0, the reference transmitting condition indicated by the condition information saved in the memory 4, and the reference environment indicated by the environment information saved in the memory 4, and may output the reference information to the communications interface 13A.

The communications interface 13A may transmit the reference information to the underwater detection device 102B in accordance with the telecommunications standard of, for example, Wi-Fi®, LTE (Long Term Evolution), 3G, or 5G, in response to the reference information outputted from the school-of-fish detector 10A.

Moreover, instead of the underwater detection device 102A transmitting the reference information by wireless communications or wired communications, it may write the reference information in a storage medium, such as a FDD (Floppy Disk Drive), a USB (Universal Serial Bus) storage, or an SD memory card. In this case, the underwater detection device 102A may not need to be provided with the communications interface 13A.

(Underwater Detection Device 102B)

The underwater detection device 102B may include a school-of-fish detector 10B, a position detector 11B, a display unit 12B, and a communications interface 13B (a first acquiring module). The configurations and operations of the school-of-fish detector 10B, the position detector 11B, and the display unit 12B in the underwater detection device 102B may be similar to the configurations and operations of the school-of-fish detector 10, the position detector 11, and the display unit 12 in the underwater detection device 101 illustrated in FIG. 1, respectively, except for the followings.

The communications interface 13B may receive the reference information transmitted from the underwater detection device 102A, and save the received reference information in the memory 4 of the school-of-fish detector 10B.

Note that the underwater detection device 102B may read the reference information from a storage medium where the reference information is written, and hold the read reference information. In this case, the underwater detection device 102B may not need to be provided with the communications interface 13B.

The school-of-fish detector 10B may not calculate the first measurement value TS0, but may perform the calculation and the update of the correction value A, and the correction of the signal intensity TS, by using the first measurement value TS0 indicated by the reference information acquired from the underwater detection device 102A.

Note that the underwater detection device 102B may perform the correction by using the first measurement value TS0 which is the measurement result of the reflection wave received by another second ship at the first position P, and may acquire this reference information from another third ship or device different from the second ship.

[Procedure of Operation]

Each device in the underwater detection system 201 may be provided with the computer including the memory, and the processor, such as the CPU, in the computer may read a program including a part or all of steps of the following sequence from the memory, and execute the program. The programs of the plurality of devices may be installable from an external device. Moreover, the programs of the plurality of devices may be distributed in a state where they are stored in recording media as the programs of the underwater detection devices 101.

Figure 10:
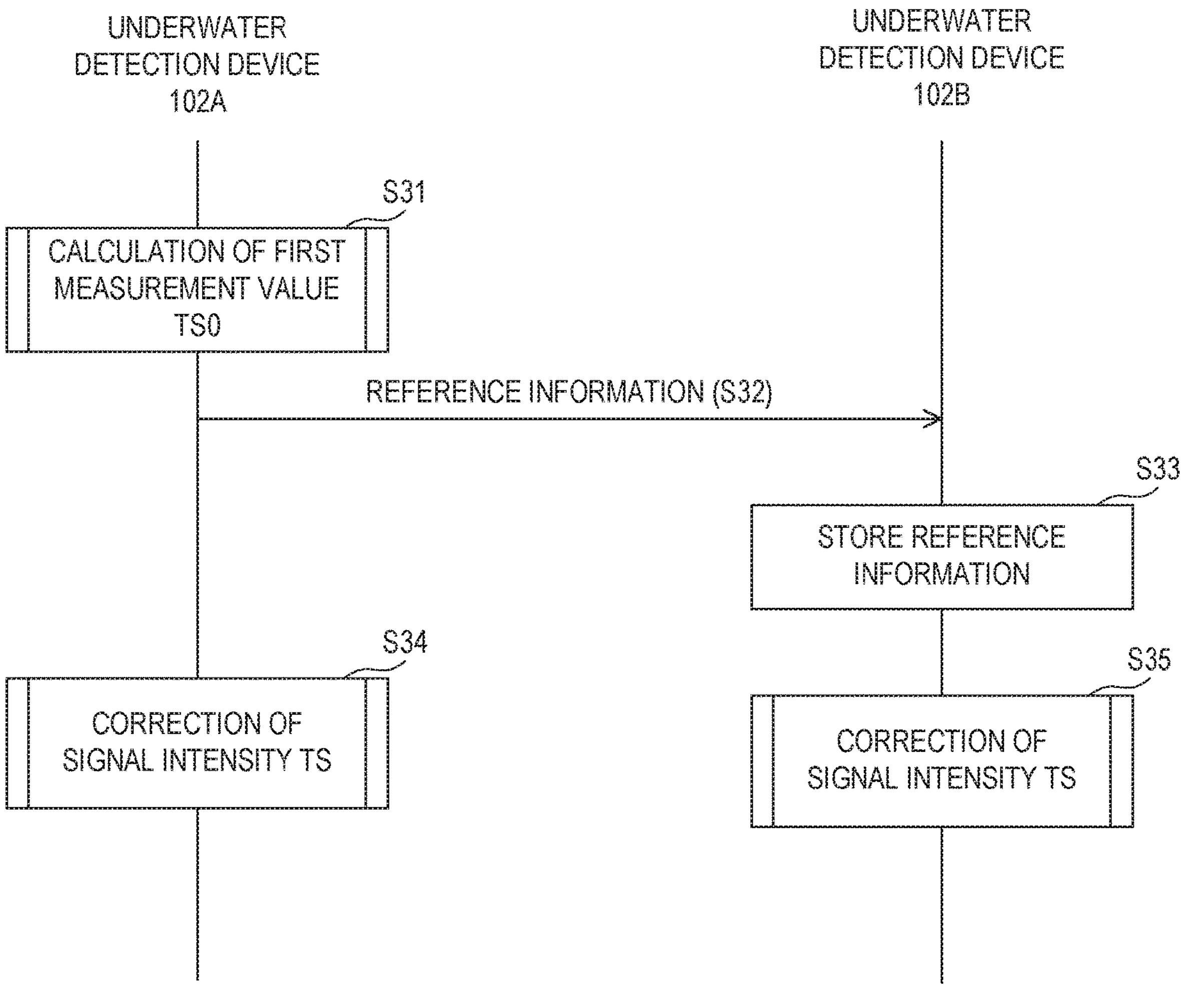
FIG. 10 is a sequence illustrating a procedure of a correction of the signal intensity by the underwater detection system according to the second embodiment of the present disclosure.

FIG. 10 illustrates a sequence illustrating a procedure of the correction of the signal intensity by the underwater detection system according to the second embodiment of the present disclosure.

Referring to FIG. 10, the underwater detection device 102A may first calculate the first measurement value TS0. The calculation of the first measurement value TS0 by the underwater detection device 102A may be similar to the operation at Steps S11-S18 illustrated in FIG. 6 (Step S31).

Next, the underwater detection device 102A may transmit to the underwater detection device 102B the reference information including the calculated first measurement value TS0, and the condition information and the environment information which are currently held (Step S32).

Next, the underwater detection device 102B may receive the reference information transmitted from the underwater detection device 102A, and hold the received reference information (Step S33).

Next, the underwater detection device 102A may correct the signal intensity TS based on the reference information including the calculated first measurement value TS0. The correction of the signal intensity TS by the underwater detection device 102A may be similar to the operation illustrated at Steps S21-S30 illustrated in FIG. 7 (Step S34).

Next, the underwater detection device 102B may correct the signal intensity TS based on the reference information received from the underwater detection device 102A. The correction of the signal intensity TS by the underwater detection device 102B may be similar to the operation illustrated at Steps S21-S30 illustrated in FIG. 7 (Step S35).

Since other configurations and operations are similar to those of the underwater detection device 101 according to the first embodiment described above, the detailed description thereof is omitted.

As described above, in the underwater detection device 102 according to the second embodiment of the present disclosure, the first measurement value TS0 may be the measurement result of the reflection wave at the first position P of another ship different from the ship.

According to such a configuration, since the correction can be performed using the common first measurement value TS0 to the plurality of ships, the variation in the detection sensitivity of the target object can be corrected among the plurality of ships. Therefore, for example, when detecting a school of fish using the detection result by each ship, a more effective detection result can be obtained.

It should be thought that the above embodiments are only illustration in every respect, and therefore, they are not thought to be in a restrictive sense. The scope of the present disclosure is illustrated not by the above description but by the appended claims, and encompasses all the changes in the meanings and scope equivalent to the claims.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controlling module, microcontrolling module, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controlling module, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow views described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein are preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. An underwater detection device, comprising:

a transmitter on a ship and configured to transmit a transmission wave from the ship;

a receiver configured to receive a reflection wave created by reflection of the transmission wave off of an object; and processing circuitry configured to:

acquire a first position of the ship based on position information provided by a position detector, acquire a first measurement value that is a measurement result of the reflection wave at the first position, acquire a second position of the ship based on position information provided by the position detector, or a second position of another ship based on position information provided by a position detector of the another ship, acquire a second measurement value that is a measurement result of the reflection wave at the second position of the ship or at the second position of the another ship, determine whether a relationship between the first position and the second position of the ship or the second position of the another ship meets a given condition, and calculate a correction value, which represents a correction in an intensity of the reflection wave at the first position, based on the first measurement value and the second measurement value under a circumstance when the given condition is met.

2. The underwater detection device of claim 1, wherein the processing circuitry is configured to:

correct the second measurement value based on the correction value when the given condition is not met.

3. The underwater detection device of claim 1, wherein the processing circuitry is configured to:

calculate the correction value based on a difference or a ratio between the first measurement value and the second measurement value.

4. The underwater detection device of claim 2, wherein the processing circuitry is configured to:

calculate the correction value based on a difference or a ratio between the first measurement value and the second measurement value.

5. The underwater detection device of claim 1, wherein the processing circuitry is further configured to:

set a threshold value by a user interface, and determine that the relationship meets the given condition when a distance between the first position and the second position is less than the threshold value.

6. The underwater detection device of claim 4, wherein the processing circuitry is further configured to: set a threshold value by a user interface, and determine that the relationship meets the given condition when a distance between the first position and the second position is less than the threshold value.

7. The underwater detection device of claim 1, wherein the first measurement value is acquired at a first timing and the second measurement value is acquired at a second timing, different from the first timing.

8. The underwater detection device of claim 6, wherein the first measurement value is acquired at a first timing and the second measurement value is acquired at a second timing, different from the first timing.

9. The underwater detection device of claim 1, wherein the processing circuitry is configured to:

determine that the relationship meets the given condition when the first measurement value and the second measurement value are measured in a same transmitting condition.

10. The underwater detection device of claim 8, wherein the processing circuitry is configured to:

determine that the relationship meets the given condition when the first measurement value and the second measurement value are measured in a same transmitting condition.

11. The underwater detection device of claim 9, wherein the transmitting condition contains a level, a pulse width, a frequency or a bandwidth of the transmission wave.

12. The underwater detection device of claim 10, wherein the transmitting condition contains a level, a pulse width, a frequency or a bandwidth of the transmission wave.

13. The underwater detection device of claim 1, wherein the first measurement value is from a bottom of a water body.

14. The underwater detection device of claim 12, wherein the first measurement value is from a bottom of a water body.

15. The underwater detection device of claim 1, wherein the processing circuitry is further configured to:

set the first position by a user interface.

16. The underwater detection device of claim 1, wherein the processing circuitry is further configured to:

set the first measurement value based on a time by a user interface.

17. The underwater detection device of claim 1, wherein the processing circuitry is further configured to:

generate a display signal of a graph indicative of a chronological change of the second measurement value acquired when the given condition is met.

18. The underwater detection device of claim 1, wherein the processing circuitry is configured to:

determine that the relationship meets the given condition when the first measurement value and the second measurement value are measured with a same depth, a same draft or a same tide.

19. An underwater detection method, comprising:

transmitting a transmission wave from a ship, receiving a reflection wave created by reflection of the transmission wave off of an object, acquiring a first position of the ship based on position information provided by a position detector, acquiring a first measurement value that is a measurement result of the reflection wave at the first position, acquiring a second position of the ship based on position information provided by the position detector, or a second position of another ship based on position information provided by a position detector of the another ship, acquiring a second measurement value that is a measurement result of the reflection wave at the second position of the ship or at the second position of the another ship, identifying that a relationship between the first position and the second position of the ship or the second position of the another ship meets a given condition, and calculating a correction value, which represents a correction in an intensity of the reflection wave at the first position, based on the first measurement value and the second measurement value.

20. A non-transitory computer-readable medium having stored thereon computer-executable instructions which, when executed by a computer, cause the computer to:

transmit a transmission wave from a ship, receive a reflection wave created by reflection of the transmission wave off of an object, acquire a first position of the ship based on position information provided by a position detector, acquire a first measurement value that is a measurement result of the reflection wave at the first position, acquire a second position of the ship based on position information provided by the position detector, or a second position of another ship based on position information provided by a position detector of the another ship, acquire a second measurement value that is a measurement result of the reflection wave at the second position of the ship or at the second position of the another ship, determine whether a relationship between the first position and the second position of the ship or the second position of the another ship meets a given condition, and calculate a correction value, which represents a correction in an intensity of the reflection wave at the first position, based on the first measurement value and the second measurement value under a circumstance when the given condition is met.

* * * * *